(12) United States Patent
Jones et al.

(10) Patent No.: US 10,974,268 B2
(45) Date of Patent: Apr. 13, 2021

(54) SYSTEM AND METHOD FOR INDICATING DEGRADED OPERATION OF A ROBOTIC PAINT STATION

(71) Applicant: GM GLOBAL TECHNOLOGY OPERATIONS LLC, Detroit, MI (US)

(72) Inventors: Steven Hawthorne Jones, East Lansing, MI (US); Michael Andrew Cieslik, East Lansing, MI (US); James Brenner, Davisburg, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 20 days.

(21) Appl. No.: 16/536,916

(22) Filed: Aug. 9, 2019

(65) Prior Publication Data
US 2021/0039124 A1 Feb. 11, 2021

(51) Int. Cl.
| | |
|---|---|
| *B05B 12/00* | (2018.01) |
| *B25J 9/16* | (2006.01) |
| *G08B 21/18* | (2006.01) |
| *G06Q 10/00* | (2012.01) |
| *G08B 7/06* | (2006.01) |
| *B25J 11/00* | (2006.01) |

(52) U.S. Cl.
CPC .......... *B05B 12/008* (2013.01); *B25J 9/1674* (2013.01); *B25J 11/0075* (2013.01); *G06Q 10/20* (2013.01); *G08B 7/06* (2013.01); *G08B 21/182* (2013.01)

(58) Field of Classification Search
None
See application file for complete search history.

(56) References Cited

U.S. PATENT DOCUMENTS

| | | | |
|---|---|---|---|
| 5,823,637 A * | 10/1998 | Blue ........................ | B60T 7/20 303/7 |
| 9,987,509 B1* | 6/2018 | Asselin .................. | A62C 37/50 |
| 2006/0057421 A1* | 3/2006 | Maria ..................... | B32B 18/00 428/688 |
| 2010/0196616 A1* | 8/2010 | Clifford .............. | B05B 12/1409 427/459 |

* cited by examiner

*Primary Examiner* — John F Mortell
(74) *Attorney, Agent, or Firm* — Quinn IP Law (57) ABSTRACT

A system for indicating degraded operation of a robotic paint station is provided. The system includes a paint nozzle operable to spray paint upon a work piece, a paint supply tube system including a plurality of paint supply tubes operable to supply a flow of paint to the paint nozzle, a vacuum system connected to the paint supply tube system and operable to remove air pockets from the paint supply tube system, a pressure sensor connected to the vacuum system, and a computerized robot control module. The computerized robot control module is programmed to monitor data from the pressure sensor, compare the data to a threshold pressure value, and generate a maintenance warning indicating degraded vacuum system operation based upon the comparing.

19 Claims, 5 Drawing Sheets

LEGEND

10 Robotic Paint Station
14 Paint Nozzle
100 Paint Supply Tube System
110 Color Changer Module
120 Paint Canister
122 Plunger Piston
124 Volume
130 Tube Control Manifold
140 Vacuum System
142 Inlet Tube
144 Outlet Tube
160 Line
162 Paint Supply Tubes

LEGEND

140 Vacuum System
149 Low Pressure Tube
200 Robot Control System
210 Pressure Sensor
220 Robot Control Module
230 Local User Interface
240 Communication Module
251 Electric Machine
252 Electric Machine
253 Electric Machine

FIG. 7

LEGEND
220 Robot Control Module
310 Processing Device
312 Paint Program Module
314 Paint Color Change Module
316 Vacuum System Pressure Monitoring and Warning Module
320 Comm. Device
330 Control Interface
340 Robotic Control Interface
350 Memory Device

FIG. 8

LEGEND
400 Process
402 Start
404 System Monitors Pressure within Low Pressure Area of Vacuum System
406 Is Monitored Pressure Less than Warning Threshold?
408 Is Monitored Pressure Less than Critical Threshold?
410 Maintenance Warning Issued
412 Order Shut Down
414 End

SYSTEM AND METHOD FOR INDICATING DEGRADED OPERATION OF A ROBOTIC PAINT STATION

INTRODUCTION

The disclosure generally relates to a system and method for indicating degraded operation of a robotic paint station.

Paint may be dispensed or sprayed from a robotic arm onto a work piece being painted. A typical work piece may include any item. In one embodiment, a metallic and/or polymerized body of a vehicle can be painted. A paint supply tube channels a flow of paint to a nozzle, and movement of the robotic arm can move the nozzle through a desired motion or sequences of motions to provide desired paint coverage upon the work piece being painted.

According to one exemplary embodiment, an electrostatic charge can be applied to the paint being sprayed, and the work piece being painted may be grounded to cause the paint particles to be attracted to the work piece.

SUMMARY

A system for indicating degraded operation of a robotic paint station is provided. The system includes a paint nozzle operable to spray paint upon a work piece, a paint supply tube system including a plurality of paint supply tubes operable to supply a flow of paint to the paint nozzle, a vacuum system connected to the paint supply tube system and operable to remove air pockets from the paint supply tube system, a pressure sensor connected to the vacuum system, and a computerized robot control module. The computerized robot control module is programmed to monitor data from the pressure sensor, compare the data to a threshold pressure value, and generate a maintenance warning indicating degraded vacuum system operation based upon the comparing.

In some embodiments, the paint supply tube system further includes a color changer module operable to provide a plurality of different color paints, and the vacuum system is operable to remove the air pockets from the paint supply tube system as the system is changing between one of the plurality of different color paints to a second of the plurality of different color paints.

In some embodiments, the vacuum system includes a venturi tube vacuum system including a low pressure area within the venturi tube vacuum system, and the pressure sensor is connected to the low pressure area.

In some embodiments, the computerized robot control module is further programmed to compare the data to a critical threshold pressure value selected to indicate that the robotic paint station has ceased to adequately operate and stop operation of the robotic paint station based upon the comparing to the critical threshold pressure value.

In some embodiments, the vacuum system is connected to the paint supply tube system with a low pressure tube, and the pressure sensor is operable to monitor pressure in the low pressure tube.

In some embodiments, the system further includes a paint canister including a plunger piston controlling the flow of paint to the paint nozzle.

In some embodiments, the vacuum system includes a mechanical vacuum system.

In some embodiments, the threshold pressure value is selected based upon a predicted failure of the vacuum system to remove the air pockets from the paint supply tube system.

In some embodiments, the threshold pressure value is selected based upon degraded operation of the vacuum system indicating a future problem.

In some embodiments, the system further includes a high pressure area including an air pressure creating device operable to create a higher than ambient air pressure within the high pressure area, and the computerized robot control module and the pressure sensor are located within the high pressure area.

In some embodiments, the high pressure area is located on an articulating arm of the robotic paint station.

In some embodiments, the maintenance warning includes a localized alarm including one of a warning light, a robot stoppage, an audible alarm, and a call for maintenance over an audio system.

In some embodiments, the maintenance warning includes a computerized prompt including one of a computerized prompt for immediate maintenance, a computerized message to a responsible manager, a computerized prompt for a scheduled maintenance event, and a computerized statistical value for facility management software.

According to one alternative embodiment, a system for indicating degraded operation of a robotic paint station is provided. The system includes a paint nozzle operable to spray paint upon a work piece, a paint supply tube system including a plurality of paint supply tubes operable to supply a flow of paint to the paint nozzle, a vacuum system connected to the paint supply tube system and including a venturi tube vacuum system. The venturi tube vacuum system includes a low pressure area within the venturi tube vacuum system. The vacuum system is operable to remove air pockets from the paint supply tube system. The system further includes a pressure sensor connected to the low pressure area within the venturi tube vacuum system and a computerized robot control module. The computerized robot control modules is programmed to monitor data from the pressure sensor, compare the data to a threshold pressure value, the threshold pressure valve selected based upon degraded operation of the vacuum system indicating a future problem, and generate a maintenance warning indicating degraded vacuum system operation based upon the comparing.

In some embodiments, the paint supply tube system further includes a color changer module operable to provide a plurality of different color paints, and the vacuum system is operable to remove the air pockets from the paint supply tube system as the system is changing between one of the plurality of different color paints to a second of the plurality of different color paints.

In some embodiments, the system further includes a high pressure area including an air pressure creating device operable to create a higher than ambient air pressure within the high pressure area, and the computerized robot control module and the pressure sensor are located within the high pressure area.

According to one alternative embodiment, a method for operating a robotic paint station is provided. The method includes utilizing a robotic paint station including a paint nozzle to spray paint upon a work piece and changing a color of paint sprayed by the robotic paint station. The changing includes purging a paint supply tube system of a first color of paint with pressurized air, evacuating the pressurized air from the paint supply tube system with a vacuum system, and charging the paint supply tube system with a second color of paint. The method further includes indicating degraded performance of the robotic paint station by monitoring a pressure within the vacuum system, comparing the monitored pressure to a threshold pressure value, and generating a maintenance warning indicating degraded vacuum system operation based upon the comparing.

In some embodiments, the vacuum system comprises a venturi tube vacuum system including a low pressure area within the venturi tube vacuum system, and monitoring the pressure within the vacuum system includes monitoring a pressure within the low pressure area.

In some embodiments, generating the maintenance warning includes generating a localized alarm including one of generating a warning light, causing a robot stoppage, generating an audible alarm, and generating a call for maintenance over an audio system.

In some embodiments, generating the maintenance warning includes generating a computerized prompt including one of generating a computerized prompt for immediate maintenance, generating a computerized message to a responsible manager, generating a computerized prompt for a scheduled maintenance event, and generating a computerized statistical value for facility management software.

The above features and advantages and other features and advantages of the present disclosure are readily apparent from the following detailed description of the best modes for carrying out the disclosure when taken in connection with the accompanying drawings.

DETAILED DESCRIPTION

A robotic paint station can include a single spray nozzle that is operable to dispense multiple colors of paint upon a sequence of work pieces. For example, a series of five vehicle bodies can progress past the robotic paint station, and each can receive a different color of paint. A paint supply tube or a plurality of tubes supply paint to the spray nozzle. Because the robotic paint station does not have a separate spray nozzle for each color of paint, at least one section of paint supply tube supplying paint to the spray nozzle may, upon the robotic paint station needing to switch from a first paint color to a second paint color, first purge the paint supply tube or tubes of the first color paint and second fill the paint supply tube or tubes with the second color paint. According to one exemplary embodiment, paint can be purged from the paint supply tubes with a burst of pressurized air, and paint can be filled in to the paint supply tubes with a combination of pressure in the supplied paint flow and vacuum pressure or low air pressure applied to the paint supply tubes in front of the paint being supplied into the paint supply tubes. Throughout the disclosure, a vacuum system is provided that can lower air pressure within a connected tube. References herein to vacuum or applying a vacuum to a tube herein are intended to describe lowering air pressure/removing air mass from a tube such that a flow of paint can be efficiently moved into a portion of tube that until recently included air.

Air within paint supply tubes supplying paint to a spray nozzle can be problematic. For example, the robotic paint station can be programmed with a sequence of motions that, when the spray nozzle is working properly, thoroughly coat the work piece being painted. However, if an air pocket is present within the paint supply tubes supplying paint to the spray nozzle, paint can fail to be sprayed from the spray nozzle for some duration of the programmed sequence of motions, such that the work piece may not be thoroughly coated as a result of the air pocket.

An air pocket can result as part of the purging of paint from the paint supply tubes, for example, if the vacuum pressure system is failing to operate normally during a color change operation. For example, if paint or other debris clogs the line or the system that supplies vacuum pressure to the line being purged, air that is supposed to be purged from the line can instead remain trapped in the line, thereby creating the air pocket and the associated problems.

In one example, air can get with a paint supply tube during a color change operation. In another example, air can get within a paint supply tube even when a single color of paint is utilized as a result of utilizing an electro-static charge in the painting process. In one embodiment, paint that is about to be sprayed upon a workpiece can be electro-statically charged to be attracted to a workpiece, wherein the workpiece may have an opposite electro-static charge to the paint. However, paint in paint supply tubes leading away from the robotic paint station or to other portions of the robotic paint station can act as a ground line, neutralizing attempts to supply an electro-static charge to the paint within the robotic paint station. A solution or a way to interrupt such a ground line through the paint in the paint supply tubes is to fill some of the tubes with pressurized air. The charged paint can be utilized to paint one or more workpieces. As that charged paint is depleted, the paint supply tube filled with air must be purged or evacuated, for example, with a vacuum system, so that a new supply of paint can be supplied to the robotic paint station. If this purging operation is not performed adequately, the pressurized air within the tube can be another exemplary source of air or an air pocket remaining within paint supply tubes.

A system is provided for monitoring operation of a robotic paint station including a vacuum system useful to purge paint supply tubes to prevent air pockets from being trapped within the paint supply tubes. By monitoring function of the vacuum system and diagnosing degradation of the function, degraded performance of the robotic paint station can be avoided.

A vacuum system useful to purge air from paint supply tubes can take many forms. In one embodiment, the vacuum system can include a venturi tube design, wherein a channel of moving air past a venturi tube creates a low pressure within the venturi tube, which can in turn be used to create low pressure within a connected tube. In another embodiment, an air pump, for example, using a rotating or reciprocating pump member, can be used to lower pressure within a tube.

By monitoring pressure within a vacuum system, a system can diagnose and warn of potential impending degradation of performance of the robotic paint station based upon degradation of the pressure within the vacuum system. A low pressure within the vacuum system within a desired range indicates that the vacuum system is operating normally. A steadily degrading low pressure within the vacuum system moving to pressures higher than the desired range can be used to indicate that the vacuum system is becoming clogged through contamination and needs to be cleaned. A suddenly degrading low pressure within the vacuum system moving to pressures higher than the desired range can be used to indicate large debris being lodged in the vacuum system or other critical failure of the vacuum system.

Figure 1:
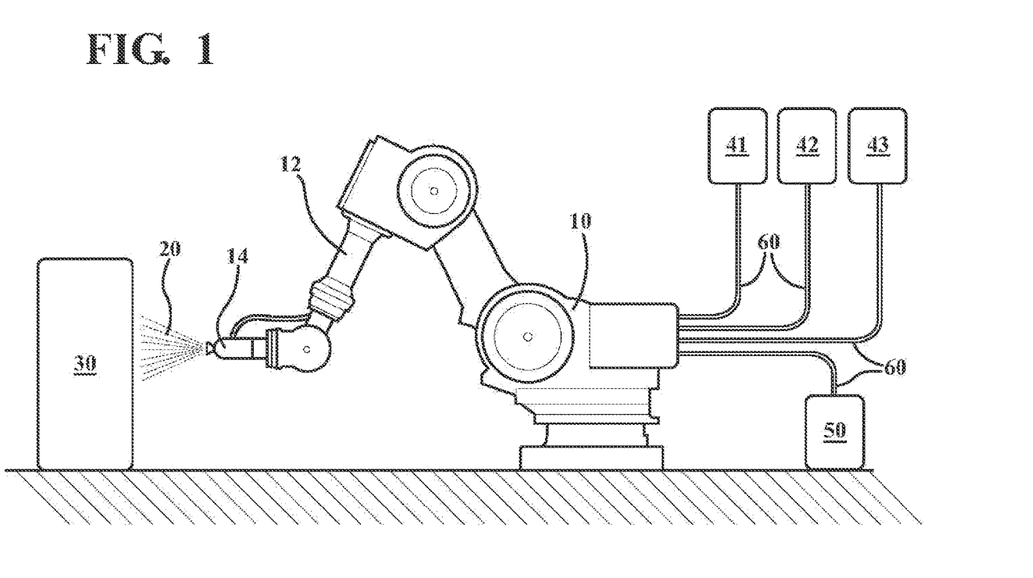
FIG. 1 schematically illustrates an exemplary robotic paint station operable to monitor vacuum pressure to prevent air pockets in paint supply tubes of the station from degrading the performance of the station, in accordance with the present disclosure.

FIG. 1 illustrates an exemplary robotic paint station operable to monitor vacuum pressure to prevent air pockets in paint supply tubes of the station from degrading the performance of the station. Robotic paint station 10 is illustrated including an articulating robotic arm 12 and a spray nozzle 14 operable to emit paint spray 20 onto workpiece 30. Articulating robotic arm 12 may include typical robotic devices, permitting articulating robotic arm 12 to bend, twist, and rotate in several different directions and direct spray nozzle 14 upon work piece 30 as needed. Robotic paint station 10 is illustrated connected through tubes 60 to a plurality of paint containers 41, 42, and 43, each including different color paints. Robotic paint station 10 is further illustrated connected to pressurized air system 50 through a tube 60, with pressurized air being useful to robotic paint station 10 to implement changes in paint color within a paint supply tube system of robotic paint station 10. Robotic paint station 10, articulating robotic arm 12, and other illustrated elements are exemplary, a number of different robotic paint station options and configurations are envisioned, and the disclosure is not intended to be limited to the particular examples provided herein.

Figure 2:
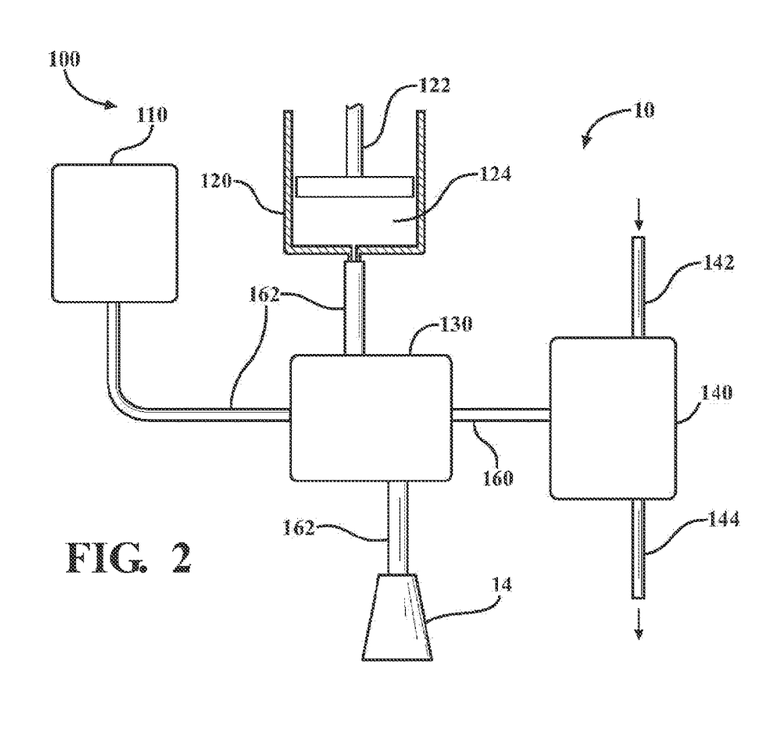
FIG. 2 schematically illustrates an exemplary paint supply tube system of the robotic paint station of FIG. 1, including features operable to permit the system to deliver a plurality of different color paints to a spray nozzle, in accordance with the present disclosure.

FIG. 2 illustrates an exemplary paint supply tube system of the robotic paint station of FIG. 1, including features operable to permit the system to deliver a plurality of different color paints to a spray nozzle. Paint supply tube system 100 is illustrated, including a network of paint supply tubes 162 operable to deliver a flow of paint to paint nozzle 14. Paint supply tube system 100 includes color changer module 110, tube control manifold 130, paint canister 120, vacuum system 140, and paint nozzle 14. Color changer module 110 is connected to paint containers 41, 42, and 43 of FIG. 1, and includes valves operable to supply different color paints to paint supply tube system 100. Valves of color changer module 110 and throughout devices of the disclosure can include vacuum actuated valves, valves operated with electronic solenoids, and other typical valve mechanisms. Tube control manifold 130 additionally includes valves and can utilize pressurized paint from color changer module 110 or paint canister 120 to fill paint supply tube 162 with a flow of paint, can utilize pressurized air to clear paint from paint supply tubes 162, and can utilize low pressure within line 160 created by vacuum system 140 to remove air from paint supply tubes 162 to prevent air pockets from being within paint supply tubes 162 when the robotic paint station is trying to paint a work piece.

Paint canister 120 is illustrated including plunger piston 122 and volume 124. Plunger piston 122 can be mechanically controlled to draw paint in through the connected paint supply tube 162 by moving up and making volume 124 larger and subsequently provide a pressurized flow of paint to paint nozzle 14 by moving down and making volume 124 smaller. According to one exemplary process, a robotic paint station can be operated, with a quantity of paint being dispensed being calculated based upon a plunger piston position or a change in plunger piston position. This calculation assumes that there are no air bubbles in the system. The disclosed process improves operation of such a process, removing or reducing error caused by air pockets trapped in the paint supply tube system.

Vacuum system 140 includes an exemplary venturi tube vacuum system which utilizes an air flow entering through inlet tube 142 and exiting through outlet tube 144 to create low pressure within tube 160.

Figure 3:
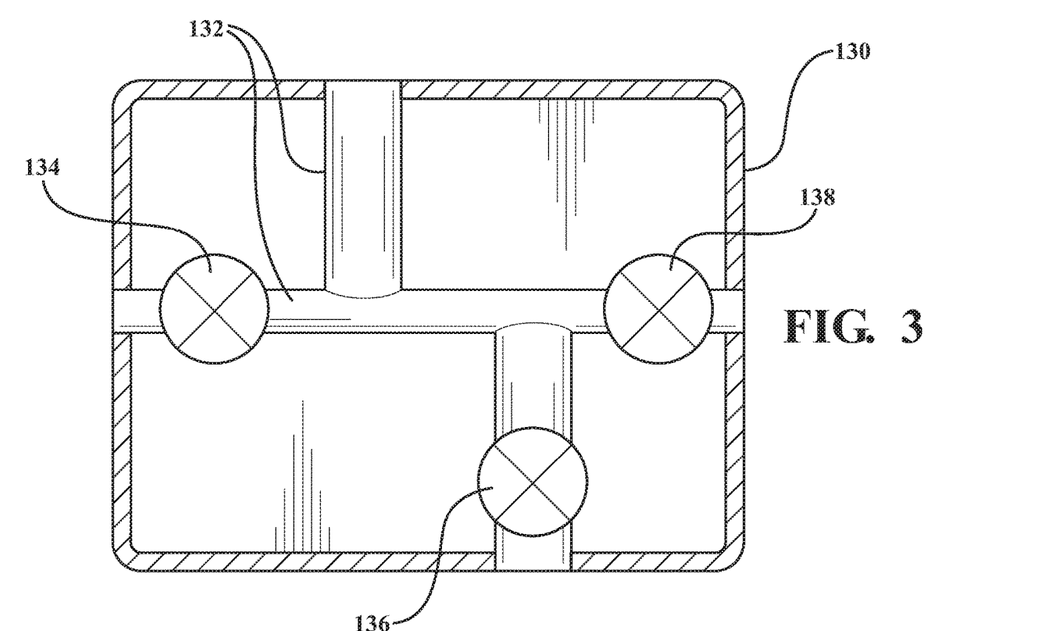
FIG. 3 schematically illustrates an exemplary tube control manifold of FIG. 2, in accordance with the present disclosure.

FIG. 3 illustrates an exemplary tube control manifold of FIG. 2. Tube control manifold 130 is illustrated including a plurality of internal passages 132 which can be selectively opened or blocked through activation of valves 134, 136, and 138, thereby controlling flow of paint, air, and low pressure through the various connected paint supply tubes. Valves 134, 136, and 138 and other similar valves in the disclosed system can be operated by electrical solenoid valve devices, electronic rotary valve devices, vacuum actuated control valve devices or other similar valve control devices.

Figure 4:
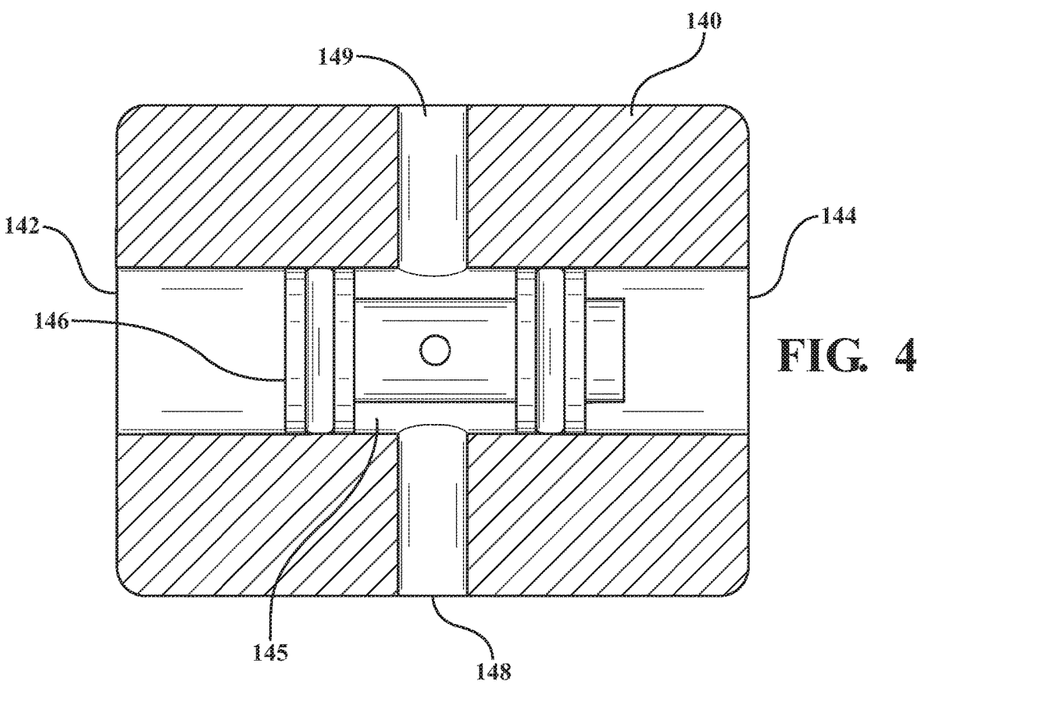
FIG. 4 schematically illustrates an exemplary venturi tube vacuum system, including a tap into a low pressure area of the vacuum system for monitoring pressure within the vacuum system, in accordance with the present disclosure.

FIG. 4 illustrates an exemplary venturi tube vacuum system, including a tap into a low pressure area of the vacuum system for monitoring pressure within the vacuum system. Vacuum system 140 is illustrated including inlet tube 142 and outlet tube 144. An air flow flows through an inner cavity of vacuum system 140 between inlet tube 142 and outlet tube 144. Venturi insert 146 is illustrated to fit within vacuum system 140 and operable to create low pressure within low pressure area 145 when the air flow flowing from inlet tube 142 to outlet tube 144 flows through a center of venturi insert 146. Low pressure tap 148 may be connected to tube 160 and can supply low pressure to the paint supply tube system of FIG. 2. Low pressure tube 149 can permit an attached pressure sensor to monitor a pressure within lower pressure area 145, so that operation of vacuum system 140 can be monitored and problems with operation of vacuum system 140 can be diagnosed or predicted.

Figure 5:
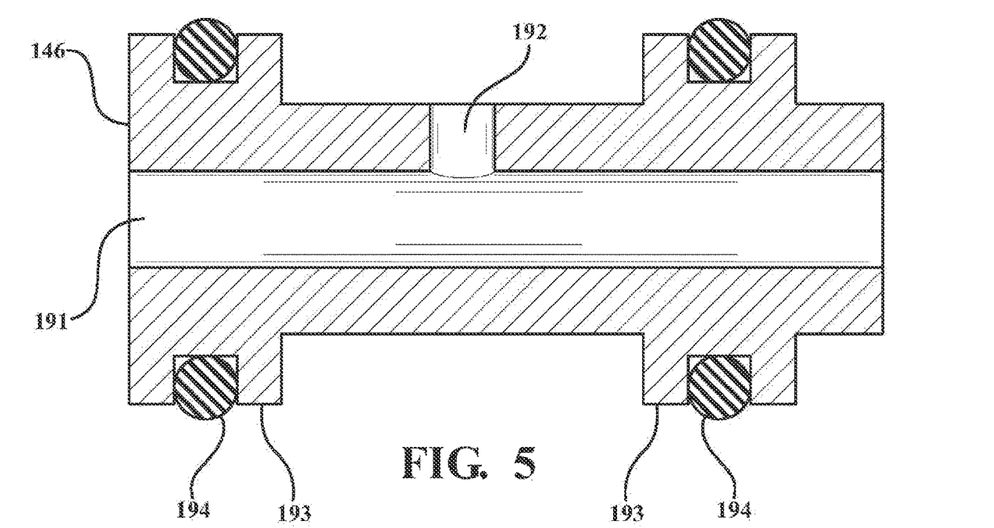
FIG. 5 illustrates a cross sectional view of an exemplary venturi insert of the venturi tube vacuum system of FIG. 4, in accordance with the present disclosure.

FIG. 5 illustrates an exemplary venturi insert of the venturi tube vacuum system of FIG. 4 in cross section view. Venturi insert 146 is illustrated including central cavity 191, venturi opening 192, raised seal rings 193, and pressure seal o-rings 194. An air flow passing through the vacuum system of FIG. 4 passes through central cavity 191 in an axial direction, from left to right in the illustration. Venturi opening 192 is operable to take advantage of the venturi effect, where a tube proximate and approximately perpendicular to a flow of air can create a low pressure within the tube. Low pressure within venturi opening 192 creates low pressure within low pressure area 145 of FIG. 4. Raised seal rings 193 are annular rings around venturi insert 146 and are operable to seal with the inner cavity of the vacuum system, and, with the aid of pressure seal o-rings 194 prevent air from passing from the inner cavity of the vacuum system outside of venturi insert 146 into low pressure area 145.

Figure 6:
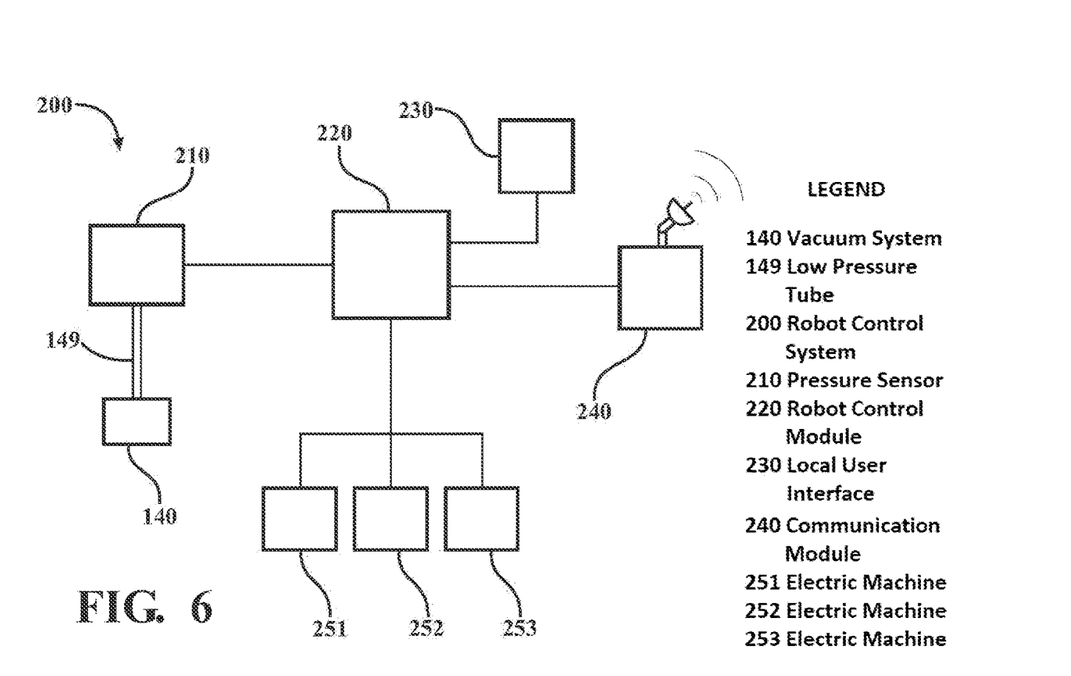
FIG. 6 schematically illustrates an exemplary robot control system, including a robot control module, the venturi tube vacuum system of FIG. 4, and a pressure sensor operable to monitor pressure within the vacuum system, in accordance with the present disclosure.

FIG. 6 illustrates an exemplary robot control system, including a robot control module, the venturi tube vacuum system of FIG. 4, and a pressure sensor operable to monitor pressure within the vacuum system. Robot control system 200 is illustrated, including robot control module 220, pressure sensor 210, local user interface 230, communication module 240, and robotic control electric machines 251, 252, and 253. Robot control module 220 is a computerized module including programming operable to operate processes disclosed herein. Pressure sensor 210 is operable to monitor a gas pressure within attached low pressure tube 149 connected to vacuum system 140. Local user interface 230 can include a display screen, warning lights, an audible siren, or other device useful to communicate to nearby personnel that the robotic paint station needs maintenance or other relative information based upon a monitored pressure within vacuum system 140. Communication module 240 includes wired and/or wireless communications connections enabling robot control system 200 to notify appropriate personnel that the robotic paint station needs maintenance or other relative information based upon a monitored pressure within vacuum system 140.

Pressure sensor 210 is connected to vacuum system 140 with low pressure tube 149. Low pressure tube 149 can be a dedicated tap into vacuum system 140. In another embodiment, low pressure tube 149 could instead include a T-shaped connection to tube 148 of FIG. 4.

Electric machines 251, 252, and 253 are exemplary and include motors operable to control movement of the robotic arm and/or valves and/or the plunger piston of the robotic paint station.

According to one exemplary embodiment, a vacuum system can be operable to provide ten or more pounds per square inch (PSI) of vacuum pressure or pressure below ambient air pressure. In one embodiment, a robotic paint station can begin having difficulty effectively clearing air pockets with the vacuum system when the low pressure delivered by the vacuum system is six PSI or less lower than ambient air pressure. In one exemplary, non-limiting embodiment, the system can be operable to provide a warning when the low pressure delivered by the vacuum system is less than eight PSI lower than ambient pressure.

Figure 7:
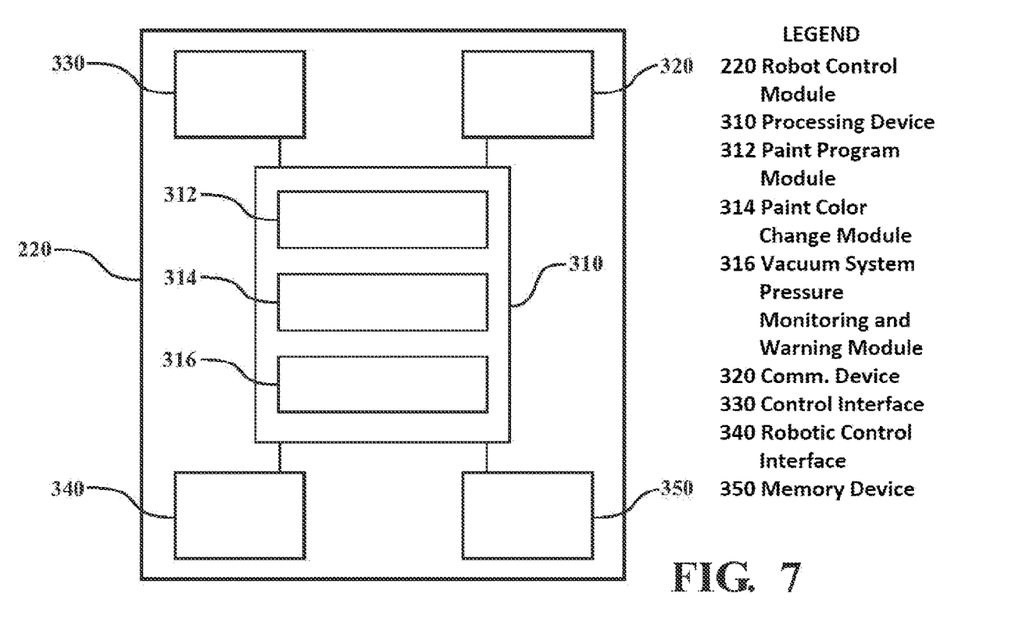
FIG. 7 schematically illustrates an exemplary robot control module, in accordance with the present disclosure.

FIG. 7 illustrates an exemplary robot control module. Robot control module 220 may include processing device 310 operable to operate computerized programming. In the illustrative embodiment illustrating optional features of the disclosed system, robot control module 220 includes processing device 310, a control interface 330, a communications device 320, a memory device 350, a robotic control interface 340. It is noted that robot control module 220 may include other components and some of the components are not present in some embodiments.

The processing device 310 may include memory, e.g., read only memory (ROM) and random-access memory (RAM), storing processor-executable instructions and one or more processors that execute the processor-executable instructions. In embodiments where the processing device 310 includes two or more processors, the processors may operate in a parallel or distributed manner. Processing device 310 may execute the operating system of the robot control module 220. Processing device 310 may include one or more modules executing programmed code or computerized processes or methods including executable steps. Illustrated modules may include a single physical device or functionality spanning multiple physical devices. In the illustrative embodiment, the processing device 310 includes robotic paint program module 312, paint color change module 314, and vacuum system pressure monitoring and warning module 316 which are described in greater detail below.

The control interface 330 is a device that allows a user to interact with the robot control module 220. While one control interface 330 is shown, the term "user interface" may include, but is not limited to, a touch screen, a physical keyboard, a mouse, a microphone, a speaker, and other user interface devices in the art.

The communications device 320 may include a communications/data connection with a bus device operable to transfer data to different components of the system and may include one or more wireless transceivers for performing wireless communication.

The memory device 350 is a device that stores data generated or received by the robot control module 220. The memory device 350 may include, but is not limited to, a hard disc drive, an optical disc drive, and/or a flash memory drive.

The robotic control interface 340 can include electronic and mechanical devices, information, and programming enabling communication with and control of the movement and operation of the robotic paint station.

Paint program module 312 includes programming operable to enable and control operation of the robotic paint station through normal operation, controlling movement and manipulation of the paint nozzle and attendant functions and devices useful to paint a work piece.

Paint color change module 314 includes programming operable to enable and control operation of a changing paint within the paint supply tubes of the robotic paint station.

Vacuum system pressure monitoring and warning module 316 operated processes disclosed herein to monitor low pressure within the vacuum system of the robotic paint station and issue warnings based upon degraded operation of the vacuum system. In one embodiment, vacuum system pressure monitoring and warning module 316 can include programming to stop operation of the robotic paint station based upon determined degradation past a certain threshold degradation, indicating that the robotic paint station is likely no longer adequately painting work pieces.

Robot control module 220 is provided as an exemplary computerized device capable of executing programmed code to operate a robotic paint station and the disclosed processes to monitor operation of the vacuum system. A number of different embodiments of robot control module 220, devices attached thereto, and modules operable therein are envisioned, and the disclosure is not intended to be limited to examples provided herein.

Figure 8:
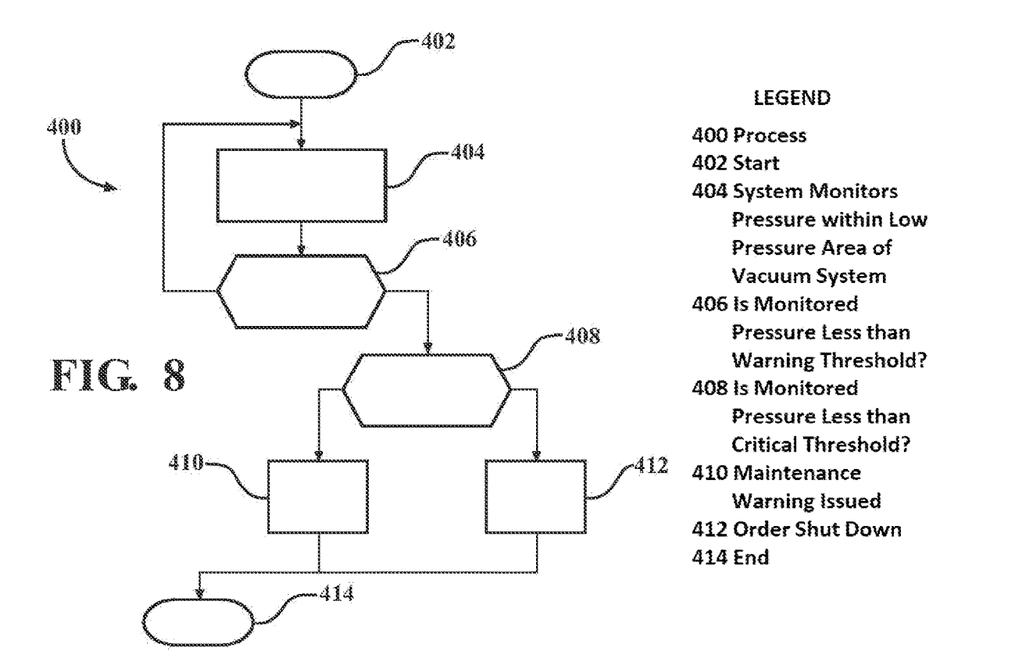
FIG. 8 is a flowchart illustrating an exemplary process to control a robotic paint station based upon monitored pressure within a vacuum system, in accordance with the present disclosure.

FIG. 8 is a flowchart illustrating an exemplary process to control a robotic paint station based upon monitored pressure within a vacuum system. Process 400 starts at step 402. At step 404, the system monitors a pressure within a low pressure area of a vacuum system. In an alternative step, the system could instead monitor pressure within a low pressure tube attached to the vacuum system. At step 406, the system determines whether the monitored pressure has degraded past a warning threshold. If the monitored pressure has not degraded past a warning threshold, the process returns to step 404, and the pressure is iteratively monitored. If the monitored pressure has degraded past a warning threshold, the process advances to step 408. At step 408, the system determines whether the monitored pressure has degraded past a critical threshold. If the pressure has not degraded past the critical threshold, the system can assume that the robotic paint station is still adequately painting work pieces, although issuing a warning advising maintenance is wise to address partial degradation of the vacuum system. The process advances to step 410, where a maintenance warning is issued. A maintenance warning can include but is not limited to a local warning light, a robot stoppage, an audible alarm, a call for maintenance over an audio system, a computerized prompt for immediate maintenance, a computerized message to a responsible engineer or manager, a computerized prompt for a scheduled maintenance event, and/or a computerized statistical value for facility management software. The process may return to step 404 to continue to monitor pressure after step 410. If the pressure has degraded past the critical threshold, the system can assume that the robotic paint station has ceased to adequately operate and paint work pieces, and at step 412, the system can order the robotic paint system to shut down. The process ends at step 414. Process 400 is provided as an exemplary process to monitor pressure within a vacuum system and diagnose or predict degraded operation of a robotic paint station based upon degraded performance of the vacuum system. A number of alternative process are envisioned, and the disclosure is not intended to be limited to the examples provided herein.

Figure 9:
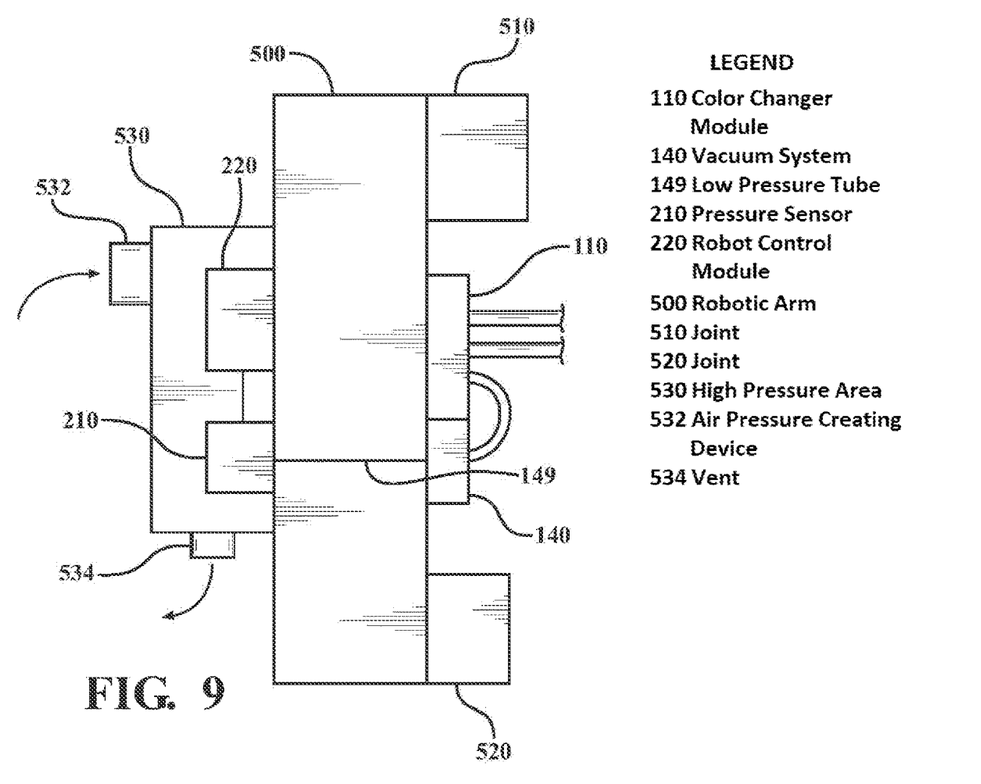
FIG. 9 schematically illustrates an exemplary configuration of a robot arm of the robotic paint station of FIG. 1, with a high pressure area containing electronics of a robot control system, in accordance with the present disclosure.

FIG. 9 illustrates in cross section an exemplary configuration of a robot arm of the robotic paint station of FIG. 1, with a high pressure area containing electronics of a robot control system. Within a painting environment, it can be advantageous to prevent paint intrusion into an area containing sensitive electronics. Robotic arm 500 is provided as an exemplary location where electronics and paint supply tube related devices can be present near a robotic paint station. Joints 510 and 520 are illustrated connected to robotic arm 500. High pressure area 530 is created by boxing in the area and placing an air pressure creating device 532 forcing clean air into high pressure area 530. Air blown into high pressure area 530 may exit high pressure area 530 through vent 534. In the exemplary high pressure area 530 of FIG. 9, a robot control module 220 and a pressure sensor 210 are illustrated mounted to robotic arm 500. On an exemplary opposite side of robotic arm 500, color changer module 110 and vacuum system 140 are illustrated mounted to robotic arm 500. Low pressure tube 149 is illustrated connecting vacuum system 140 and pressure sensor 210 in accordance with the disclosure.

Figure 10:
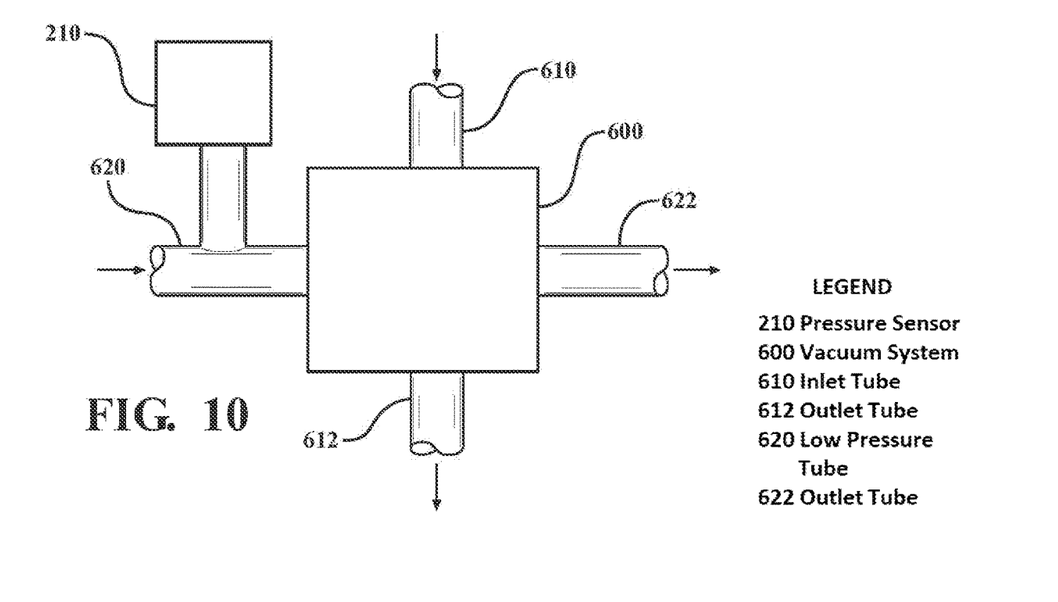
FIG. 10 schematically illustrates an exemplary alternative mechanical vacuum system, in accordance with the present disclosure.

FIG. 10 illustrates an exemplary alternative mechanical vacuum system.

Vacuum system 600 is illustrated including an exemplary mechanical vacuum system. Such a system can include a reciprocating or rotated pump mechanism. In one embodiment, vacuum system 600 can be electrically powered. In the embodiment of FIG. 10, an air flow entering through inlet tube 610 and exiting through outlet tube 612 create low pressure within attached low pressure tube 620. Air is removed or pumped out of low pressure tube 620 resulting a flow through outlet tube 622. Pressure sensor 210 is illustrated located in a T-shaped connection with low pressure tube 620 to monitor degraded operation of vacuum system 600.

While the best modes for carrying out the disclosure have been described in detail, those familiar with the art to which this disclosure relates will recognize various alternative designs and embodiments for practicing the disclosure within the scope of the appended claims.

What is claimed is:

1. A system for indicating degraded operation of a robotic paint station, comprising:
   a paint nozzle operable to spray paint upon a work piece;
   a paint supply tube system comprising a plurality of paint supply tubes operable to supply a flow of paint to the paint nozzle;
   a vacuum system connected to the paint supply tube system and operable to remove air pockets from the paint supply tube system;
   a pressure sensor connected to the vacuum system; and
   a computerized robot control module programmed to:
      monitor data from the pressure sensor;
      compare the data to a threshold pressure value; and
      generate a maintenance warning indicating degraded vacuum system operation based upon the compared data; and
   wherein the vacuum system is connected to the paint supply tube system with a low pressure tube; and
   wherein the pressure sensor is operable to monitor pressure in the low pressure tube.

2. The system of claim 1, wherein the paint supply tube system further comprises a color changer module operable to provide a plurality of different color paints; and
   wherein the vacuum system is operable to remove the air pockets from the paint supply tube system as the system is changing between one of the plurality of different color paints to a second of the plurality of different color paints.

3. The system of claim 1, wherein the vacuum system comprises a venturi tube vacuum system comprising a low pressure area within the venturi tube vacuum system; and
   wherein the pressure sensor is connected to the low pressure area.

4. The system of claim 1, wherein the computerized robot control module is further programmed to:
   compare the data to a critical threshold pressure value selected to indicate that the robotic paint station has ceased to adequately operate; and
   stop operation of the robotic paint station based upon the comparing to the critical threshold pressure value.

5. The system of claim 1, further comprising a paint canister comprising a plunger piston controlling the flow of paint to the paint nozzle.

6. The system of claim 1, wherein the vacuum system comprises a mechanical vacuum system.

7. The system of claim 1, wherein the threshold pressure value is selected based upon a predicted failure of the vacuum system to remove the air pockets from the paint supply tube system.

8. The system of claim 1, wherein the threshold pressure value is selected based upon degraded operation of the vacuum system indicating a future problem.

9. The system of claim 1, further comprising a high pressure area comprising an air pressure creating device operable to create a higher than ambient air pressure within the high pressure area; and
   wherein the computerized robot control module and the pressure sensor are located within the high pressure area.

10. The system of claim 9, wherein the high pressure area is located on an articulating arm of the robotic paint station.

11. The system of claim 1, wherein the maintenance warning comprises a localized alarm comprising one of a warning light, a robot stoppage, an audible alarm, and a call for maintenance over an audio system.

12. The system of claim 1, wherein the maintenance warning comprises a computerized prompt comprising one of a computerized prompt for immediate maintenance, a computerized message to a responsible manager, a computerized prompt for a scheduled maintenance event, and a computerized statistical value for facility management software.

13. A system for indicating degraded operation of a robotic paint station, comprising:
   a paint nozzle operable to spray paint upon a work piece;
   a paint supply tube system comprising a plurality of paint supply tubes operable to supply a flow of paint to the paint nozzle;
   a vacuum system connected to the paint supply tube system and comprising a venturi tube vacuum system comprising a low pressure area within the venturi tube vacuum system, the vacuum system operable to remove air pockets from the paint supply tube system;
   a pressure sensor connected to the low pressure area within the venturi tube vacuum system; and
   a computerized robot control module programmed to:
      monitor data from the pressure sensor;
      compare the data to a threshold pressure value, the threshold pressure value selected based upon degraded operation of the vacuum system indicating a future problem; and
      generate a maintenance warning indicating degraded vacuum system operation based upon the comparing; and
   wherein the paint supply tube system further comprises a color changer module operable to provide a plurality of different color paints; and
   wherein the vacuum system is operable to remove the air pockets from the paint supply tube system as the system is changing between one of the plurality of different color paints to a second of the plurality of different color paints.

14. The system of claim 13, further comprising a high pressure area comprising an air pressure creating device operable to create a higher than ambient air pressure within the high pressure area; and
   wherein the computerized robot control module and the pressure sensor are located within the high pressure area.

15. A method for operating a robotic paint station, comprising:
   utilizing a robotic paint station comprising a paint nozzle to spray paint upon a work piece;
   changing a color of paint sprayed by the robotic paint station, the changing comprising:
      purging a paint supply tube system of a first color of paint with pressurized air;
      evacuating the pressurized air from the paint supply tube system with a vacuum system; and
      charging the paint supply tube system with a second color of paint; and
   indicating degraded performance of the robotic paint station by monitoring a pressure within the vacuum system, comparing the monitored pressure to a threshold pressure value, and generating a maintenance warning indicating degraded vacuum system operation based upon the comparing.

16. The method of claim 15, wherein the vacuum system comprises a venturi tube vacuum system comprising a low pressure area within the venturi tube vacuum system; and
   wherein monitoring the pressure within the vacuum system comprises monitoring a pressure within the low pressure area.

17. The method of claim 15, wherein generating the maintenance warning comprises generating a localized alarm comprising one of generating a warning light, causing a robot stoppage, generating an audible alarm, and generating a call for maintenance over an audio system.

18. The method of claim 15, wherein generating the maintenance warning comprises generating a computerized prompt comprising one of generating a computerized prompt for immediate maintenance, generating a computerized message to a responsible manager, generating a computerized prompt for a scheduled maintenance event, and generating a computerized statistical value for facility management software.

19. The system of claim 13, further comprising a high pressure area comprising an air pressure creating device operable to create a higher than ambient air pressure within the high pressure area; and
   wherein the computerized robot control module and the pressure sensor are located within the high pressure area.

* * * * *